Patented Nov. 3, 1931

1,829,999

UNITED STATES PATENT OFFICE

CHRISTIAN R. E. MERKLE, OF FLINT, MICHIGAN, ASSIGNOR TO E. I. DU PONT DE NEMOURS & COMPANY, OF WILMINGTON, DELAWARE, A CORPORATION OF DELAWARE

COATING COMPOSITION AND PROCESS OF PREPARING SAME

No Drawing. Application filed January 16, 1928. Serial No. 247,259.

This invention relates to improvements in coating compositions and the processes of preparing the same. More particularly, it relates to drying oil coating compositions and methods of preventing premature oxidation of the compositions.

Many types of paints and varnishes containing drying oils exhibit the objectionable property of quickly developing tough, rubber-like films across their upper surfaces or just above the settled pigment (in the case of pigmented products) when allowed to stand for a relatively short time in open containers. Films of this nature which form across the upper surfaces of the mixtures are generally spoken of as "skins", whereas the films which develop below the upper liquid surfaces and usually immediately above the settled pigment, are known as "blankets". In paints or enamels containing certain types of pigments, as well as in mixtures containing large proportions of China wood oil or heavy bodied linseed oil, the tendency toward film formation is frequently so strong that tough skins or blankets will even develop during storage of the compositions in bulk in their original containers, i. e., before the can is opened for application of the product. Another objectionable effect is the so-called "fatty" condition, "gone fatty" being a common term in the trade when the vehicle develops increased viscosity, reduced flowing properties and often retarded drying properties. These difficulties have made it impractical in the past to market various types of paints and varnishes, which in other respects possess very desirable characteristics, such as rapid drying properties, good water resistance, etc.

Furthermore, there are numerous industrial applications of paint and varnish,—and in particular those involving dipping operations,—which require the material in the dip-tank or other container to undergo considerable contact with air and yet remain free from objectionable "skinning" or "breaking" due to aeration. The term, "breaking", is generally used to define the phenomenon which often accompanies oxidation of an oil or oleo-resinous composition, usually under conditions of more or less extended agitation of the product in contact with air, whereby there separates from the vehicle an insoluble or immiscible precipitant phase of a cheesy nature, normally possessing the characteristics of linoxyn or jellied china wood oil or jellied varnish. A "break" of this type is quite similar in appearance to that frequently observed upon excessive thinning of varnishes with mineral thinners. In the past, these rapid skinning and breaking difficulties, encountered with many readily oxidizable coating compositions when exposed to air in dip-tanks or spray feed systems, have been very troublesome and have very definitely limited the use of otherwise desirable products in such finishing procedures.

In the manufacture of paint and varnish involving the use of drying oil, it is often customary to use a suitable quantity of an oxidation catalyst to speed up the normal drying rate of the oil so that the composition will dry hard within a reasonable time when it is spread in a thin film. This positive oxidation catalyst is commonly called a drier and usually contains a heavy metal salt, for example, salts of manganese, iron, lead, cobalt or the like. In addition some of the commonly used pigments, for example, some of the iron salts, such as Prussian blue, are known to function as oxidation catalysts. It is known that these driers induce various oxidation phenomena, some of which are necessary and desirable and some of which are very objectionable from the practical operation standpoint. In particular it has been found that under some conditions or concentrations the drier may induce premature oxidation phenomena while the composition is still in bulk form, and these premature oxidation phenomena when they occur are very troublesome in connection with systems of storage and application, which involve retaining the composition for a considerable time in the bulk form and especially when considerable contact with air is involved. The most serious of these oxidation phenomena are "skinning", "breaking" and "blanketing", as already described.

It also has been known for some time that readily oxidizable substances or so-called auto-oxidizable compounds can be protected from normal or accelerated oxidation by the addition of protective agents, often termed oxidation inhibitors. For example, substances such as acrolein, sodium sulfite, and linseed oil have been readily stabilized against normal oxidation by the addition of various selected inhibitors. Thus, it has been stated that hydroquinone inhibits the oxidation of linseed oil whereby the latter can be exposed to the air in thin layers for years without losing its fluidity.

On the other hand, however, the indiscriminate addition of an oxidation inhibitor to a paint or varnish in order to protect it from skinning or breaking through contact with air may seriously retard the drying rate (particularly if the drying is to be accomplished at normal temperature) of said composition after application of the coating upon the article to be coated. In other words, although it would seem that the skinning or breaking could be avoided by addition of inhibitor, it would likewise appear that the drying rate of the paint or varnish film after application would, from a practical point of view, be objectionably retarded. Therefore, the use of these inhibitors as satisfactory remedies for these skinning and breaking difficulties has not heretofore been applied practically in the manufacture of paint and varnish, because no method has been known whereby the inhibitors or negative catalysts could be used to counteract the objectionable oxidation phenomena of the positive catalyst (drier) without at the same time counteracting the useful and necessary oxidation phenomena, which these positive catalysts are employed to induce.

The present invention has as an object the provision of a method for preventing the above described rapid skinning and breaking difficulties which are exhibited by various protective coating compositions when exposed to air in bulk form for a more or less extended length of time, e. g., in dip-tanks or in feed systems for spraying equipment, etc. A further object is to provide a method for maintaining the resistance of paints, varnishes, etc., against skinning, blanketing, and breaking when exposed to oxidation for a relatively long period of time in a dipping system or the like, without, however, seriously affecting the general working properties, (e. g., flowing, covering, drying time, hardness of the dried coating after application, etc.,) of the product in question. Another object is to prevent paints, varnishes, and the like, which exhibit tendencies toward skinning and blanketing during storage in their original containers before being opened to the air, from developing such films during their period of storage. A still further object of this invention is the development of the improved protective coating compositions resulting from the practice of the described stabilizing procedures. Other objects will appear hereinafter.

These objects are attained by the following invention, by means of which coating compositions, which possess the objections here under consideration, can be stabilized and protected from the defined skinning, blanketing and breaking characteristics, without objectionably altering their ultimate drying rate or other working properties, by additions of negative catalysts or oxidation inhibitors and by controlling the character and the magnitude of said additions such that the desired protection of the composition is obtained as long as the latter exists in what may be designated as the "bulk" state, but at the same time the ultimate drying rate after application or the other working properties of the composition are not objectionably altered from a practical point of view. The term, "bulk" state, is here used to define a volume of material, the depth or thickness of which is appreciably greater than that of films resulting from the normal applications of paints, varnishes and the like on articles to be coated. In particular, it has been found that small amounts of phenolic or amino compounds are especially adaptable for use in controlled amounts as inhibitors for these purposes. It has also been discovered that there are various factors which enter into the choice and application of these protective agents for different classes of paints and varnishes, as well as for the different procedures which are employed in the industrial application of protective coatings. These factors are considered in the disclosures which will be described in detail.

I have found that the functioning of the negative catalyst is not merely the opposite of that of the positive catalyst, but, instead, the behavior of the catalysts is highly selective in that the negative catalyst is much more active in counteracting some oxidation phenomena of the positive catalyst than others. In particular I have discovered that the negative catalyst, when present in very small proportions, selectively counteracts the bulk from oxidation phenomena in preference to the thin film oxidation phenomena of the positive catalyst.

The exact quantitative effect of the negative catalyst varies greatly with various conditions and factors. For example, it varies with the particular materials present in the composition and with the temperature. However, quite contrary to normal expectation, for any given set of conditions there exists a comparatively narrow range of proportions within which the negative catalyst effectively counteracts the bulk form oxidation phenomena of the postive catalyst and the coating composition while exerting a scarcely noticeable effect on the thin film oxidation phenomena.

In accordance with the present invention a paint or varnish is prepared according to the known methods of the art, using drier or some form of positive oxidation catalyst sufficient but not greatly in excess to induce a normal thin film drying rate, no negative catalyst being present; and to this is added a negative catalyst adjusted as to quantity so as to give definite "resistance potential" against premature oxidation in bulk but not enough to reduce the thin film oxidation rate to an objectionable degree for practical paint purposes.

An important feature of this process is the system of control to be described later in this specification and by which it is possible, in any given case, (1) to determine the required proportion of positive catalyst, (2) to determine the required initial proportion of negative catalyst and (3) to maintain the negative catalyst at maximum effectiveness during various conditions of storage and application within the operative range. By this system of control it is possible to adjust the positive and negative catalysts to meet practically any situation or set of conditions as to materials, storage, application or drying, practically eliminating or, at the least, greatly reducing those undesirable oxidation phenomena which are induced by the positive catalyst.

Many organic substances have been mentioned in the prior art as general anti-oxidants and it is found that many of these may be used in the present process, provided that suitable control is applied according to my invention. There are to be mentioned some of those negative catalysts which have given the most satisfactory results, but it should be understood that these negative catalysts may vary greatly in power or efficiency not only as compared with each other but, in addition, the same catalyst may vary in efficiency, depending on the conditions under which it is used. Since it is desired, in general, to counteract the bulk form oxidation phenomena rather than the thin film phenomena, it is preferable for many purposes to select a negative catalyst which is sufficiently stable under bulk form conditions but which becomes less active or which partially or completely disappears under the conditions of exposure in a thin film.

The first factor to be considered in the choice and proportioning of the inhibitor or negative catalyst for use with a given coating composition is the procedure which is to be used in drying the coating after application of the latter has been carried out. Drying is, in general, accomplished in one or a combination of two ways: either by allowing the applied film to dry naturally at normal temperature, or by exposing the product to elevated temperatures, usually for the purpose of accelerating the rate of drying. There are, of course, other means for accelerating the drying rate such as exposure to ultraviolet light and the application of ozonized air. For present purposes, these latter accelerated drying procedures may be broadly grouped with the natural drying conditions obtainable at normal temperatures under ordinary conditions of practice.

I have discovered that with some compositions, drying at elevated temperatures, the negative catalyst becomes less active either because it reacts with a constituent of the composition or because it is partially or completely volatilized under the conditions of exposure. Under air-drying conditions some of the available negative catalysts are more satisfactory than others, possibly because they are somewhat volatile under such conditions. Thus I find for air-dry work that some volatile negative catalysts such as eugenol, thymol, oil of cloves and the like are particularly satisfactory and permit a greater leeway in operation in comparison with relatively non-volatile negative catalysts, for example, hydroquinone which, while usable according to my system, requires more exact control to give satisfactory results. It is necessary, however, in any case to control the amount of the inhibitor present in the mixture such that the ultimate drying rate is not seriously retarded. In general, I have found that the higher the drying temperature, the larger the amount of a given inhibitor which can be safely employed.

A second factor to be considered in the choice and proportioning of the inhibitor for use with a given coating composition is the degree of solubility of the inhibitor in the mixture under consideration. To be effective it is necessary that the negative catalyst be thoroughly dispersed thruout the composition and that no separation occurs during storage. This dispersion is very readily accomplished if the negative catalyst is soluble in the paint vehicle and, in general, I prefer to use a negative catalyst which is soluble in the vehicle present. However, in some cases I may use a negative catalyst which is insoluble or only partially soluble and in such cases, suitable dispersion is obtained by applying the usual paint grinding methods known to the art. Some of the suitable amino and phenolic compounds are very sparingly soluble in the general run of vehicles here encountered, whereas others are soluble or miscible in large proportions. Then again, certain of the inhibitors are liquids at normal temperatures whereas others are solids. For varnishes or unpigmented compositions, it is usually desirable to employ an inhibitor possessing sufficient solubility to be entirely miscible with the vehicle, although sparingly soluble agents may also be conveniently employed in a more or less finely dispersed state, produced readily by grinding the agent into a portion of the vehicle. With paints and similar pigmented compositions, the use of soluble inhibitors is also desirable, but sparingly soluble or substantially insoluble agents have, in many instances, been found to function very satisfactorily. Often, soluble inhibitors are preferable to insoluble ones, due to simplicity of application and the insurance of uniform distribution. The correct proportioning of the optimum amount of either a soluble or practically insoluble agent to be used in stabilizing a given coating composition may be readily determined by a few preliminary tests carried out in accordance with disclosures appearing later.

Two other factors to be considered in the choice of the inhibitor to be used with a given coating composition are the characteristics of the vehicle and the types of pigments or fillers at hand. The efficiencies and suitabilities of different inhibitors have been found to vary more or less with different types of vehicles. Trials of a few selected agents of the types mentioned herein afford a means of readily establishing a suitable system for any given vehicle. Since the variation in the compositions of vehicles coming within the scope of this invention is exceedingly wide, it would be practically impossible to fully classify the types of vehicle and inhibitor combinations which give the optimum systems. The application of the invention to any given vehicle, however, can be readily accomplished as indicated.

Relative to the problem of satisfying various pigment and filler combinations, the same remarks, in general, hold true as are discussed under consideration of different types of vehicles. Compositions containing relatively large proportions of iron blue pigments and black pigments have often been found to be particularly susceptible to skinning and breaking. Such compositions require efficient protection, and I have found that controlled amounts of phenyl alpha naphthylamine and eugenol are particularly adaptable in most cases for the protection of these products. A specific illustration of this control is presented later.

The following are specific examples of some of the phenolic compounds which are useful as oxidation inhibitors or negative catalysts in the present process:—hydroquinone, eugenol, thymol, pyrogallol, beta naphthol, resorcinol, p-amino phenol. Among these, hydroquinone, pyrogallol, resorcinol, and p-amino phenol are sparingly soluble in drying oils, oleo-resinous vehicles, and the common commercial paint and varnish thinners. The others are soluble or miscible in these typical solvents within the desired range of concentrations. Hydroquinone, thymol, pyrogallol, beta naphthol, resorcinol, and p-amino phenol are solids at normal temperatures, whereas eugenol is a liquid.

The following are specific examples of some of the amino compounds which are also useful as negative catalysts in the same manner as the phenolic compounds:—phenyl alpha naphthylamine, diphenylamine, p-amino phenol, hexamethylene tetramine, benzidine. Among these, p-amino phenol, hexamethylene tetramine, and benzidine are sparingly soluble, whereas phenyl alpha naphthylamine and diphenylamine are soluble to the desired extent.

Other useful amino and phenolic compounds are for example—dibeta naphthylamine, phenol, alpha naphthol, guaiacol, analine, etc.

For the stabilization of compositions, which after applications are to be dried at normal temperature, thymol and eugenol are particularly effective in preventing or sufficiently retarding skinning and blanketing. For compositions to be dried at elevated temperatures, all of the above listed inhibitors are suitably provided, of course, that the necessary precautions in controlling the amount of the inhibitor are observed.

The present system of control is very flexible and provides the means whereby, having determined on the negative catalyst to be used suited to the specific materials and conditions, the initial quantity of the negative catalyst may be set at a point such that the desired results may be obtained and a satisfactory resistance potential may be maintained up to the moment of application. The system of control permits attaining the desired result and automatically takes account of differences in power or efficiency of the negative catalyst and takes account also of the various conditions of storage and drying. In general, the quantity of the negative catalyst which will be found sufficient to overcome premature oxidation will be less than 1% on the basis of the total composition. In using a volatile negative catalyst for a composition intended to be air-dried, ordinarily about .1 to .125% of a negative catalyst such as eugenol, thymol, oil of cloves and the like is sufficient. In some cases I find that up to about .05% very little benefit is obtained and in proportions above .2% the air-drying rate is too low for some purposes. It is understood that the ranges here cited are not to be considered as the absolute figures in view of the fact that there exist numerous compositions which warrant the use of smaller or larger additions of inhibitor than those specified in accordance with the general procedure of the invention and the characteristics of the compositions being treated.

The addition of the inhibitor to the composition requiring stabilization may be accomplished at any convenient step in the preparation of the product or to the final formulation. Thus, the inhibitor may be introduced during mixing of the base prior to grinding (in the case of pigmented products) or during the final thinning operation. An inhibitor such as hydroquinone, which is but sparingly soluble in the normal vehicles, may be ground separately in a part of the thinner or vehicle and introduced into the formula in the form of a paste. The only strict limitation which need be mentioned with respect to applying the inhibitor is that it be not introduced at a step following which the remaining operations for making the composition would lead to the decomposition of the inhibitor. My preferred process is to introduce the inhibitor after the paint or varnish has been formulated and in a manner such that reasonably uniform distribution of the agent throughout the product to be stabilized will be insured. If the inhibitor is added to the vehicle and pigment mixture before grinding (in the production of pigmented goods), it is generally advisable to use larger amounts of the agent in order to obtain a "resistance potential" in the final formulated product as high as that obtainable by adding the amount, predetermined as optimum for incorporation by direct addition to said normal final formulated product.

The skinning or blanketing test is carried out in the following manner: The sample to be tested is stored in 1/32 gallon friction-top cans at normal temperature under three sets of conditions:

(a) Can full, open to atmosphere,
(b) Can half-full, closed,
(c) Can full, closed.

Examination of the material exposed in the open can is made at hourly intervals. When the open can fails, examinations are started on the other two samples, conditions being observed as often as seems necessary without undue exposure to fresh atmosphere. Gradings are recorded for skinning, (incipient, half-skinned, and completely skinned) as well as for blanketing. Resistance potentials can in this manner be established within a precision of 10%, which is sufficiently accurate for the purpose. The ratings are expressed in hours of exposure to a chosen standard of failure, or in other intervals as desired.

The "breaking" test is performed as follows:—140 cubic centimeters of the sample to be tested are placed in a common 12-ounce wide-mouth bottle fitted with a stopper containing two glass tubes, one of which extends almost to the bottom of the bottle, and serves as an air inlet tube; the other tube extends only a short distance into the bottle, and serves as the gas exit tube. The temperature is maintained at 35° C., by partially immersing the bottle in a thermostatically controlled bath. Air, saturated with the vapors of the thinners present in the sample, is forced through the inlet tube at the rate of 1,600 cc. per minute. There results, therefore, a continuous vigorous bubbling of fresh air through the sample. The test is run continuously except that the gas flow is stopped for a minute or two each hour in order that the sample may be examined. Examination consists of making a small flow-out of the sample on a glass slide, and noting the condition of the specimen after it has been allowed to set-up for 10 to 20 minutes at room temperature. A number of samples may readily be tested simultaneously by hooking them together in series by means of rubber tubes. "Resistance potentials" are recorded in terms of total hours from start to failure and failure is ordinarily taken at the appearance of a definite "break" of the vehicle. This point can easily be established within a precision of 10% which is sufficiently accurate for the desired purposes.

The following are specific examples showing the use of various inhibitors in accordance with the present invention and expressing the "resistance potentials" in terms of measurements made by empirical skinning and breaking tests just described. These examples demonstrate the benefits derived from the use of inhibitors under careful control and show the ease of maintaining the proper control over the compositions.

A paint (A) consisting of an oleo-resinous vehicle containing a mixture of a kettle-bodied linseed oil and a 50 gallon linseed-rosin varnish, thinned with turpentine substitute, and also containing pigments and fillers including Prussian blue, lithopone, lampblack (in relatively small amount), iron oxide, whiting, and blanc fixe, was blended in varying amounts with another paint (B) consisting of components of the same types and amounts as those present in (A) with the exception that the Prussian blue in (A) was replaced with lithopone in (B). The influence of treatments of the above individual paints and blends thereof with three separate inhibitors is illustrated by the following Table I: (Percentages of inhibitors are expressed on the basis of the total weight of the paint being stabilized.)

Table I

R. P.—resistance potential (hours) determined by breaking test.

| Composition | 100% (A) | 75% (A) 25% (B) | 50% (A) 50% (B) | 25% (A) 75% (B) | 100% (B) |
|---|---|---|---|---|---|
| Prussian blue content | 6.6% | 5.0% | 3.7% | 1.6% | none |
| R. P. (no inhibitor) | 7 hrs. | 8 hrs. | 14 hrs. | 14 hrs. | 14 hrs. |
| R. P. (0.1% eugenol) | 46 | 46 | 41 | 40 | 45 |
| R. P. (0.1% phenylalpha-naphthylamine) | 111 | 130 | 127 | 140 | 146 |
| R. P. (0.1% hydroquinone) | 21 | 27 | 35 | 37 | 456+ |

The data illustrate the selectivity of the three inhibitors for variation in pigment character. The paints in question were intended for use in systems where drying was accomplished in two hours at 250° Fahrenheit. No substantial differences in the hardness of the dried films obtained with or without the application of the above controlled amounts of inhibitors could be detected at the end of the established elevated temperature drying schedule. The data also definitely illustrate the efficacy of phenyl-alpha-naphthylamine for the Prussian blue combination, and the hydroquinone for the other. A small amount of blue greatly reduced the efficiency of the hydroquinone, whereas the change of pigment appeared to exert practically no effect on the eugenol efficiency.

The effect of variation in the amount of a given inhibitor upon the resistance potential of a specific paint combination is illustrated by Table II.

Table II

Tests made on paint (A) described above

| Inhibitor | Per cent used | Breaking test—R. P. in hours |
|---|---|---|
| None | None | 6 |
| Hydroquinone | .05 | 21 |
| Hydroquinone | .1 | 30 |
| Hydroquinone | .2 | 40 |
| Hydroquinone | .4 | 60 |
| Eugenol | .05 | 27 |
| Eugenol | .1 | 46 |
| Eugenol | .2 | 81 |
| Eugenol | .4 | 122 |
| Thymol | .05 | 40 |
| Thymol | .1 | 64 |
| Thymol | .2 | 181 |
| Thymol | .4 | 383 |
| Phenyl-alpha-naphthylamine | .05 | 58 |
| Phenyl-alpha-naphthylamine | .1 | 111 |
| Phenyl-alpha-naphthylamine | .2 | 273 |
| Phenyl-alpha-naphthylamine | .4 | 415 |

These data show the increased protection afforded by the use of increasing amounts of the inhibitor.

The effect of variation in the vehicle is illustrated by the data in Table III. (C) is a 40 gallon China wood oil-resin varnish, containing 34% solids, thinned with turpentine substitute. (D) is a 45 gallon China wood oil-linseed (8:1)-rosin varnish, containing 43% solids, thinned with turpentine substitute. Open can skinning test data for these two clear varnishes are recorded as follows:

Table III

| R. P. (Hours—Open can skinning test.) | Varnish (C) | Varnish (D) |
|---|---|---|
| For no inhibitor | 168 | 10 |
| With 0.1% eugenol | 190 | 76 |

The factor of control essential in order to obtain a sufficient improvement in skinning, etc., and yet retain drying properties which are satisfactory from a practical point of view, is illustrated by the following examples (Table IV). The paint product (E), in this case, consisted of a vehicle the same as that of varnish (C) above, thinned with turpentine substitute, and containing as the pigment combination, sublimed white lead, Spanish iron oxide, lampblack (in small amount) and china clay. The application of inhibitors to this product and the effect of said applications upon the keeping qualities and drying properties of the stabilized products are shown below:—

Table IV (Paint E)

| Inhibitor | Amount | Skinning data Open can R. P. | Drying data Film dried at 75° F. |
|---|---|---|---|
| Control | None | 4 hrs. | Hard dry 20 hrs. |
| Eugenol | 0.1% | 65 | Hard dry 30 hrs. |
| Eugenol | 0.5 | 176 | Hard dry 30 hrs. |
| Eugenol | 1.0 | 352+ | Hard dry 30 hrs. |
| Eugenol | 5.0 | No data | Hard dry 42 hrs. |
| Thymol | 0.1 | 166 | Hard dry 20 hrs. |
| Thymol | 0.5 | 278 | Hard dry 30 hrs. |
| Thymol | 1.0 | 352+ | Hard dry 33 hrs. |
| Thymol | 5.0 | No data | Hard dry 45 hrs. |
| Hydroquinone paste | 0.1 | 16 | Hard dry 33 hrs. |
| Hydroquinone paste | 0.5 | 287+ | Hard dry 70 hrs. |
| Hydroquinone paste | 1.0 | No data | Wet after 125 hrs. |

The above data illustrate very well the necessity for control of the amount of inhibitor within a definite range in order to retain satisfactory drying schedules at normal temperatures. The data also show the advantages of thymol and eugenol versus hydroquinone for this specific system.

Table V presents a series of data illustrating an application of the discovered method for maintaining the resistance of a paint composition over a long period in contact with air. The paint in question is paint (A) referred to in Table I. 5,000 gallons of this paint were exposed to contact with air in a large dip-tank, the area of the exposed surface being approximately 400 square feet.

The rate of turnover or make-up on this tank was such that, when in use, the consumption was about 100 gallons per every twenty-four hours. The material initially contained 0.1% hydroquinone on the basis of the paint.

Resistance potentials (R. P.) were determined by withdrawing small samples from the tank at the stated intervals, and submitting same to the above described "breaking" aeration test. The gradings are in hours measured by this test.

Table V

| Days duration from start of operation | Remarks |
|---|---|
| 1 | R. P. = 11 hours |
| 2 | R. P. = 10½ |
| 8 | R. P. = 8 |
| 14 | R. P. = 5½ |
| 16 | R. P. = 6 |
| 17 | R. P. = 7 |
| 19 | R. P. = 5½ |
| 20 | R. P. = 5 |
| 22 | R. P. = 4½ |
| 24 | R. P. = 4¼ |
| 27 | R. P. = 6 |
| 27+ | Addition of 0.06% hydroquinone |
| 27½ | R. P. = 15 |
| 31 | R. P. = 12 |
| 35 | R. P. = 14 |
| 45 | R. P. = 7 |
| 49 | Addition of 0.2% eugenol |
| 50 | R. P. = 116 |
| 50–77 | Tank not in use; storage in essentially open tank. |
| 77 | R. P. = 77 |
| 85 | R. P. = 66 |

After a period of over 120 days this material was still in use and in very satisfactory condition. The consumption rate is compensated for by the frequent addition of fresh coating composition which contains about 0.1% of a suitable inhibitor, such as hydroquinone, eugenol, etc. The applied coating in this specific case is dried at elevated temperature.

All of the compositions described in the tests contained as a positive oxidation catalyst, about 0.30% of a lead manganese drier, of which about 0.14% was lead reckoned as $Pb_3O_4$ and about 0.16% was manganese reckoned as $MnO_2$.

It has been found that for most purposes the phenolic and amino compounds are suitable as inhibitors for use with drying oil coating compositions. While these compounds are very satisfactory and effective, there are other types of compounds which exhibit the oxidation-inhibition properties desired and the present invention is not necessarily limited to the use of the two classes of substances cited specifically. As has been pointed out, the invention applies broadly to the use of oxidation inhibitors with drying oil coating compositions, exercising the proper control of kind and quantity of inhibitor employed such that the working properties of the stabilized compositions are not objectionably altered from those of normal or unstabilized compositions. As has been pointed out, this system of control is particularly applicable in connection with the drying oil compositions containing a positive oxidation catalyst.

The following tabulation sets forth some of the more preferred inhibitors for the various conditions of use:—

1—For normal temperature drying, I prefer thymol or eugenol.
2—For elevated temperature drying, I prefer—
    (a) Phenyl alpha naphthylamine (low and medium temperatures),
    (b) Hydroquinone,
    (c) Diphenylamine,
    (d) Alpha naphthol,
3—For iron blue pigments and blacks I prefer—
    (a) Phenyl alpha naphthylamine,
    (b) Thymol,
    (c) Eugenol.
    (d) Diphenylamine.
4—For whites and red oxides and light colored pigmented goods in general, I prefer hydroquinone if elevated temperatures are to be used in drying, and thymol or eugenol if normal drying temperatures are employed.

It is obvious that the processes and compositions described may be varied widely in their details without departing from the spirit or scope of the invention. These possible variations will be apparent to those skilled in the art and the present invention is not limited to the specific details mentioned, except as described in the appended claims.

I claim:

1. A coating composition containing a drying oil, a positive oxidation catalyst and an oxidation inhibitor, the respective amounts and character of said positive oxidation catalyst and inhibitor being sufficient to substantially prevent oxidation of the composition in the bulk state without materially retarding the normal drying rate of the composition in the thin film form.

2. The improvement in the manufacture of coating compositions which comprises mixing a drying oil with a positive oxidation catalyst, and adding to this mixture an oxidation inhibitor of such character and in such amount as will retard oxidation of the composition in the bulk form without materially retarding the drying rate of the composition in film form.

3. A coating composition containing a drying oil, a solvent, a resin, a positive oxidation catalyst and an oxidation inhibitor, the respective amounts and character of said positive oxidation catalyst and inhibitor being sufficient to substantially prevent oxidation of the composition in the bulk state without materially retarding the normal drying rate of the composition in the thin film form.

4. The improvement in the manufacture of coating compositions which comprises mixing a drying oil with a positive oxidation catalyst, and adding to this mixture an oxidation inhibitor of such character and in such amount as will retard oxidation of the composition in the bulk form without materially retarding the drying rate of the composition in film form, the oxidation inhibitor being a member of the group which consists of phenolic and amino compounds.

5. The improvement in the manufacture of coating compositions to be dried at elevated temperatures which comprises mixing a drying oil with a positive oxidation catalyst, and adding to this mixture an oxidation inhibitor of such character and in such amount as will prevent substantial oxidation of the composition in the bulk form but which inhibitor will be rendered substantially inactive at the temperatures used for drying the composition in the film form.

In testimony whereof I affix my signature.

CHRISTIAN R. E. MERKLE.